US012779960B2

(12) United States Patent
Ukihashi et al.

(10) Patent No.: US 12,779,960 B2
(45) Date of Patent: Nov. 3, 2026

(54) JOINT STRUCTURE AND VEHICULAR BACK DOOR

(71) Applicant: RESONAC CORPORATION, Tokyo (JP)

(72) Inventors: Naoki Ukihashi, Tokyo (JP); Masayoshi Iwabuchi, Tagawa (JP)

(73) Assignee: RESONAC CORPORATION, Tokyo (JP)

( * ) Notice: Subject to any disclaimer, the term of this patent is extended or adjusted under 35 U.S.C. 154(b) by 272 days.

(21) Appl. No.: 18/705,202

(22) PCT Filed: Jun. 21, 2023

(86) PCT No.: PCT/JP2023/023026
§ 371 (c)(1),
(2) Date: Apr. 26, 2024

(87) PCT Pub. No.: WO2024/004800
PCT Pub. Date: Jan. 4, 2024

(65) Prior Publication Data

US 2024/0424875 A1 Dec. 26, 2024

(30) Foreign Application Priority Data

Jun. 28, 2022 (JP) ................................. 2022-103845

(51) Int. Cl.
*B60J 5/00* (2006.01)
*B60J 5/10* (2006.01)

(52) U.S. Cl.
CPC ..................................... *B60J 5/107* (2013.01)

(58) Field of Classification Search
CPC ........... B60J 5/107; B29C 65/52; B29C 65/56
(Continued)

(56) References Cited

U.S. PATENT DOCUMENTS

2016/0031299 A1* 2/2016 Ikeda ....................... B60J 5/107 49/502
2016/0167492 A1* 6/2016 Ikeda ....................... B60J 5/101 296/146.2
(Continued)

FOREIGN PATENT DOCUMENTS

JP 2-274640 11/1990
JP 2013-106180 5/2013
(Continued)

OTHER PUBLICATIONS

International Search Report issued Jul. 25, 2023 in International Application No. PCT/JP2023/023026.

*Primary Examiner* — Steven O Douglas
(74) *Attorney, Agent, or Firm* — Wenderoth, Lind & Ponack, L.L.P.

(57) ABSTRACT

A joint structure including a second panel serving as a member to be joined made from resin, a third adhesive disposed on a join face of the second panel, a bracket serving as a joining member that includes a base made from resin joined to the second panel by the third adhesive and a protruding portion that is contiguous to the base and that protrudes outside from an adhesion region between the base and the second panel, a first coupling portion that is provided at the adhesion region and that couples the bracket and second panel, a second coupling portion that is separated from the first coupling portion at the adhesion region and that couples the bracket and the second panel, and one or more rotation stop portion that is separated from an imaginary line connecting the first coupling portion and the second coupling portion, and that stops the bracket from rotating about an axis of the imaginary line.

3 Claims, 18 Drawing Sheets

(58) Field of Classification Search
USPC .......................................................... 296/202
See application file for complete search history.

(56) References Cited

U.S. PATENT DOCUMENTS

| | | | | |
|---|---|---|---|---|
| 2017/0066306 | A1* | 3/2017 | Ueno | ....................... B60J 5/101 |
| 2019/0217690 | A1 | 7/2019 | Chiba et al. | |

FOREIGN PATENT DOCUMENTS

| | | |
|---|---|---|
| JP | 6382563 | 8/2018 |
| JP | 2019-123394 | 7/2019 |

* cited by examiner

JOINT STRUCTURE AND VEHICULAR BACK DOOR

TECHNICAL FIELD

The present disclosure relates to a joint structure and a vehicular back door.

BACKGROUND ART

A hitherto known back door device made from resin closes off an openable/closeable back door opening formed in a rear wall of a vehicular body of a vehicle, as in Japanese Patent No. 6382563. The body of the back door may be configured by joining a resin inner panel and a resin outer panel together using an adhesive. Hereafter an inner panel and an outer panel will be collectively referred to simply as "panel members".

In an operation to join two panel members together, for example, first an adhesive is disposed on a planned adhesive placement region pre-set on a join face of one of the panel members. Then a join face of the other panel member is caused to approach the planned adhesive placement region on the surface of the one panel member by movement along a pre-set approach direction. As a result of this approach, the join face of the other panel member contacts peaks in the adhesive, and also the join faces of the two panel members are superimposed on each other. After the join faces have been superimposed the two panel members are joined together by the adhesive curing.

Japanese Patent No. 6382563 describes an internal space being formed between the inner panel and the outer panel that have been joined together. If water such as rainwater ingresses into the internal space, then lingering water readily causes a drop in quality of the panel members configuring the body of the back door, and a drop in strength of a join section. Thus Japanese Patent No. 6382563 describes a water escape hole being formed in an outer edge of the inner panel at a lower end portion of the back door to externally discharge water that ingresses into the internal space.

Patent Document 1: Japanese Patent No. 6382563

SUMMARY OF INVENTION

Technical Problem

In a back door, a joining member such as a bracket may be joined with adhesive to a panel member serving as a member to be joined. The joining member not only includes a base joined to the join face of the member to be joined, but also includes a protruding portion that protrudes toward the outside from an adhesion region of the join face of the member to be joined and the base, with a center of gravity of the joining member further from the adhesion region due to the protruding portion. As a result thereof, a large delamination moment acts on the join face when a given load has been input to the protruding portion. This means that the joining member readily moves under its own weight. Moreover, for example, an operator is liable to contact the protruding portion of the joining member during an operation to join the joining member and the member to be joined together.

This means that in the operation to join the joining member including the protruding portion and the member to be joined, there is an issue in that the joining member is liable to move while the adhesive disposed in the adhesion region is still curing. The adhesive is deformed in the adhesion region at portions contacting the join face of the joining member accompanying such movement of the joining member while the adhesive is still curing. This means that after the adhesive has cured, there may be grooves formed in the adhesion region at positions where the adhesive deformed.

These formed grooves act as pathways for water such as rainwater, and so there is a concern regarding a drop in waterproofness of the back door in the adhesion region. In the technology of Japanese Patent No. 6382563, although there is high water discharge ability of the back door due to the water escape holes, there is no specific investigation related to a drop in waterproofness at the adhesion region of the joining member and the member to be joined.

In consideration of the above circumstances, an object of the present disclosure is to provide a joint structure and a vehicular back door that are capable of improving waterproofness in an adhesion region between a joining member and a member to be joined.

Solution to Problem

Specific means to address the above issues are set out below.

According to a first aspect of the invention, a joint structure includes:

- a member to be joined that is made from resin;
- an adhesive that is disposed on a join face of the member to be joined;
- a joining member that includes a base made from resin joined to the member to be joined by the adhesive and a protruding portion that is contiguous to the base and that protrudes outside from an adhesion region between the base and the member to be joined;
- a first coupling portion that is provided at the adhesion region and that couples the joining member and the member to be joined;
- a second coupling portion that is separated from the first coupling portion at the adhesion region and that couples the joining member and the member to be joined; and
- one or more rotation stop portion that is separated from an imaginary line connecting the first coupling portion and the second coupling portion, and that stops the joining member from rotating about an axis of the imaginary line.

According to a second aspect of the invention, in the joint structure of the first aspect of the invention:

- the first coupling portion and the second coupling portion are each formed by a fitting structure; and
- the rotation stop portion is formed by a weld structure.

In a third aspect of the invention, a vehicular back door that is a vehicular back door including the joint structure of the first or second aspects of the invention, wherein:

- the member to be joined is a panel member; and
- the joining member is a bracket that supports the panel member.

The present disclosure enables a joint structure and a vehicular back door to be provided that enable waterproofness to be improved in an adhesion region between a joining member and a member to be joined.

DESCRIPTION OF EMBODIMENTS

Figure 1:
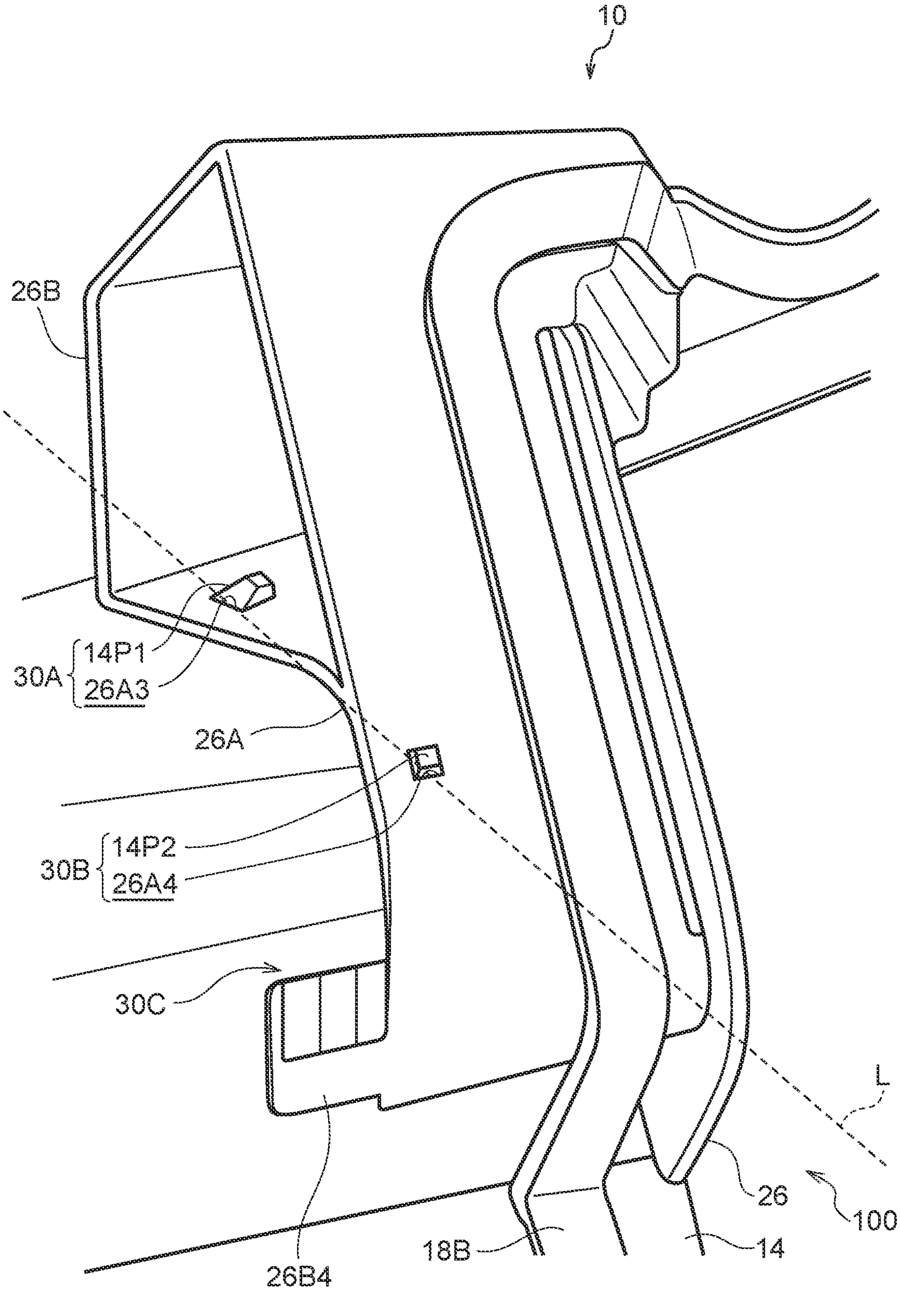
FIG. 1 is a diagram to explain a joint structure according to an exemplary embodiment of the present disclosure.

Description follows regarding an exemplary embodiment of the present disclosure. Similar reference numerals are appended to similar portions in the following description of the drawings. However, the drawings are merely schematic, and relations between thickness and plane dimensions, and ratios of thicknesses in each device and each member, differ from actual ratios. This means that the specific thicknesses and dimensions should be determined while referring to the following description. Moreover, there are also portions where the relationship of dimensions and ratios differ from each other between the respective drawings. Moreover, unless explicitly stated otherwise in the present specification, there is no limitation to there being one item of each configuration element in the present disclosure, and there may be plural present thereof.

Vehicular Back Door

Figure 5:
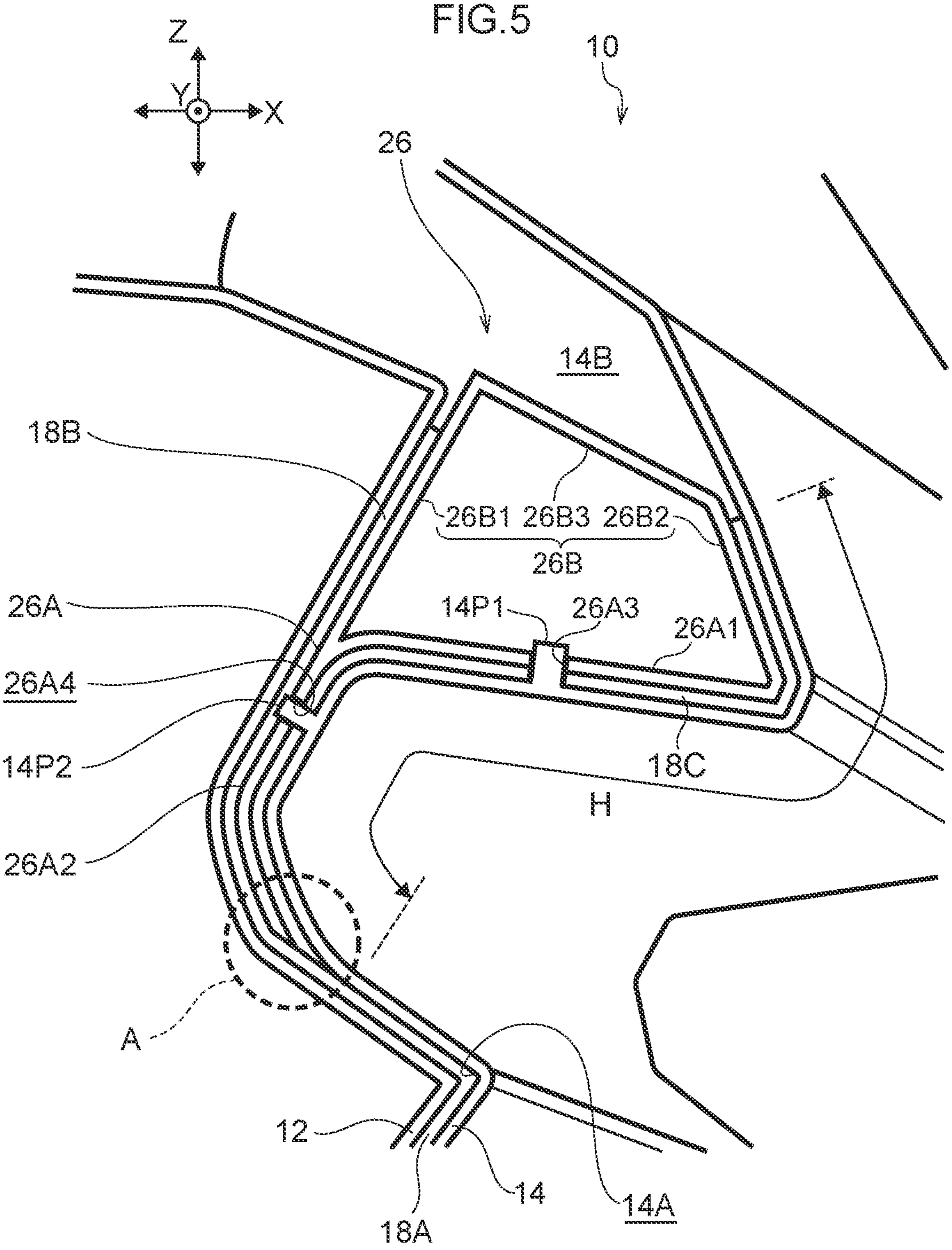
FIG. 5 is a cross-section to explain a vehicular back door according to the present exemplary embodiment.

Description follows regarding a vehicular back door 10 according to the present exemplary embodiment, with reference to FIG. 1 to FIG. 7. As illustrated in FIG. 1, a joint structure 100 according to the present exemplary embodiment includes the vehicular back door 10. As illustrated in FIG. 5, the vehicular back door 10 includes a first panel 12, a second panel 14, a first adhesive 18A, a second adhesive 18B, a third adhesive 18C, and a bracket 26. Note that for ease of explanation, hereafter vehicular back door is simply referred to as "back door".

The back door 10 is provided so as to be capable of opening and closing an opening in a rear section of a vehicular body of a vehicle. A front-rear direction X and an up-down direction Z of the vehicular body are each indicated by double-direction arrows in FIG. 5. A vehicular body width direction Y intersects perpendicularly with both the front-rear direction X and the up-down direction Z.

Moreover, the joint structure 100 according to the present exemplary embodiment includes the second panel 14 serving as a member to be joined, the third adhesive 18C serving as an adhesive, the bracket 26 serving as a joining member, a first coupling portion 30A, a second coupling portion 30B, and a rotation stop portion 30C.

Panel Member

Figure 2:
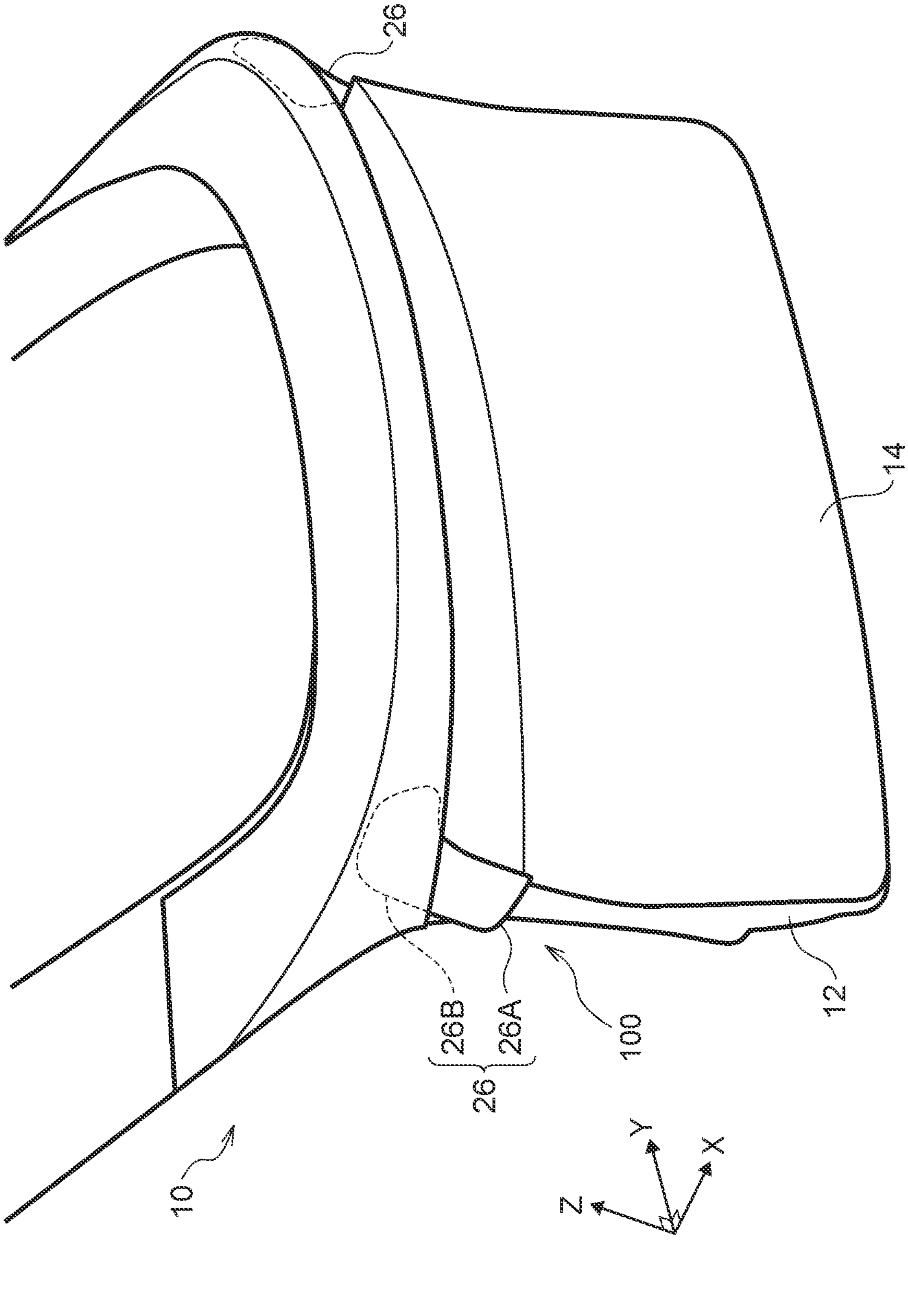
FIG. 2 is a perspective view to explain a vehicular back door according to the present exemplary embodiment.

As illustrated in FIG. 2, both the first panel 12 and the second panel 14 are members configuring the back door 10. Both the first panel 12 and the second panel 14 are made from resin and may, for example, be molded using an injection molding machine. Specifically, a glass fiber composite polypropylene material containing glass fiber at a specific content by weight % may, for example, be employed in the first panel 12. A polypropylene material compounded with talc or rubber may, for example, be employed in the second panel 14.

Note that in the present disclosure the resin material employed to mold the panel members is not particularly limited. The resin employed as the resin material is, for example, preferably at least one resin selected from the group consisting of a polypropylene (PP) resin, a polypropylene composite (PPC) resin, and an Acrylonitrile-Butadiene-Styrene copolymer (ABS) co-polymer resin.

In the present exemplary embodiment, the second panel 14 serving as a member to be joined is a vehicular panel member made from resin. In the present disclosure the member to be joined is not limited to being the second panel, and may be the first panel or, for example, may be a member other than a panel member, such as a bracket. Moreover, in the present disclosure the member to be joined may be a component other than for a vehicle.

Recess

The second panel 14 includes two recesses that open toward the first panel 12. Specifically, in the present exemplary embodiment the second panel 14 includes a first recess 14A positioned at a lower side in FIG. 5, and a second recess 14B positioned at an upper side in FIG. 5. In other words, there are two protrusions that protrude toward a right side of the front-rear direction X in FIG. 5, namely toward a rear side of the vehicle, disposed in a row along the up-down direction Z on the outer panel of the second panel 14 of the present exemplary embodiment. Note that in the present disclosure the number of individual recesses formed to the panel member can be set freely to any number of one or greater.

Adhesive

Figure 3:
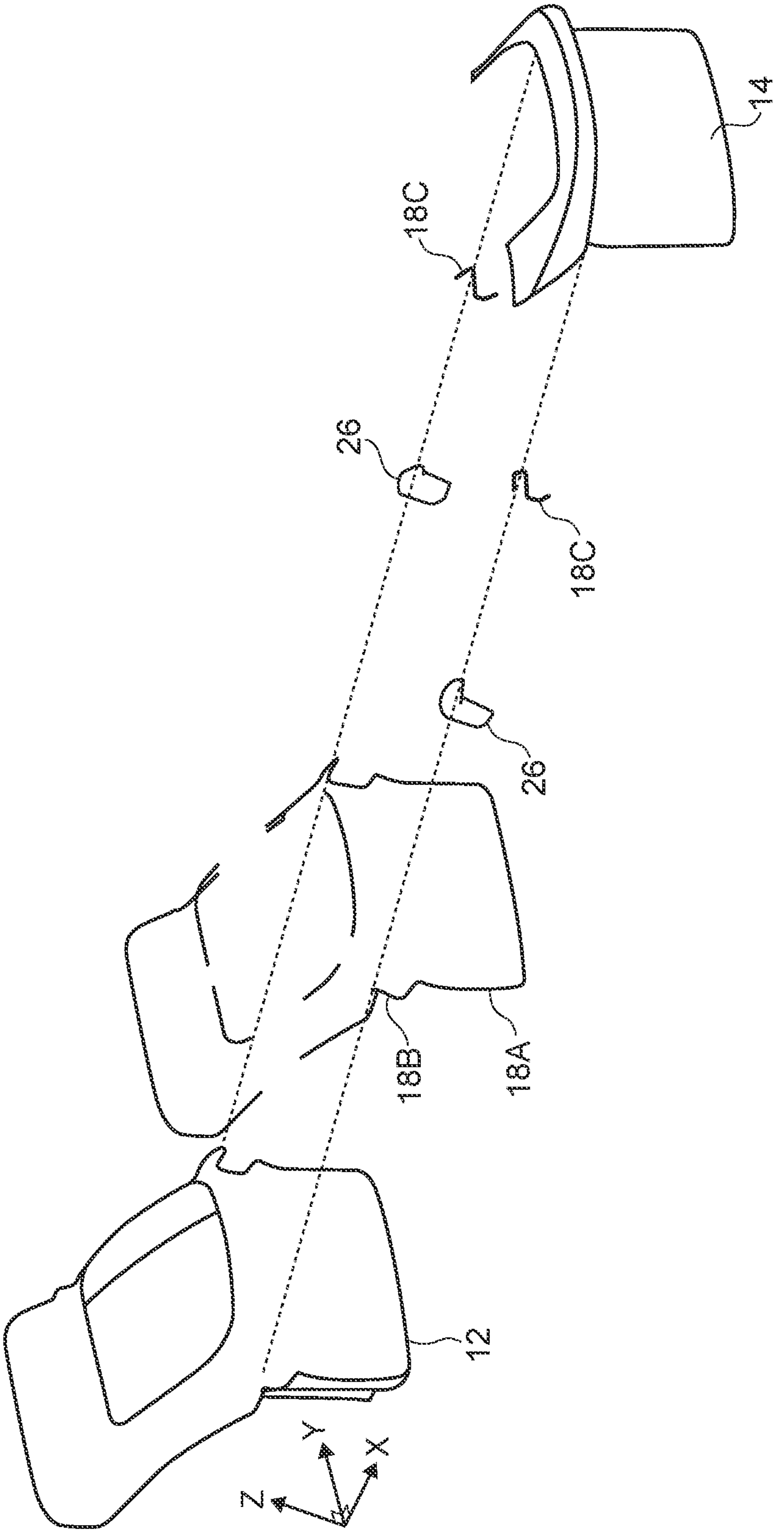
FIG. 3 is an exploded assembly diagram to explain a vehicular back door according to the present exemplary embodiment.
Figure 4:
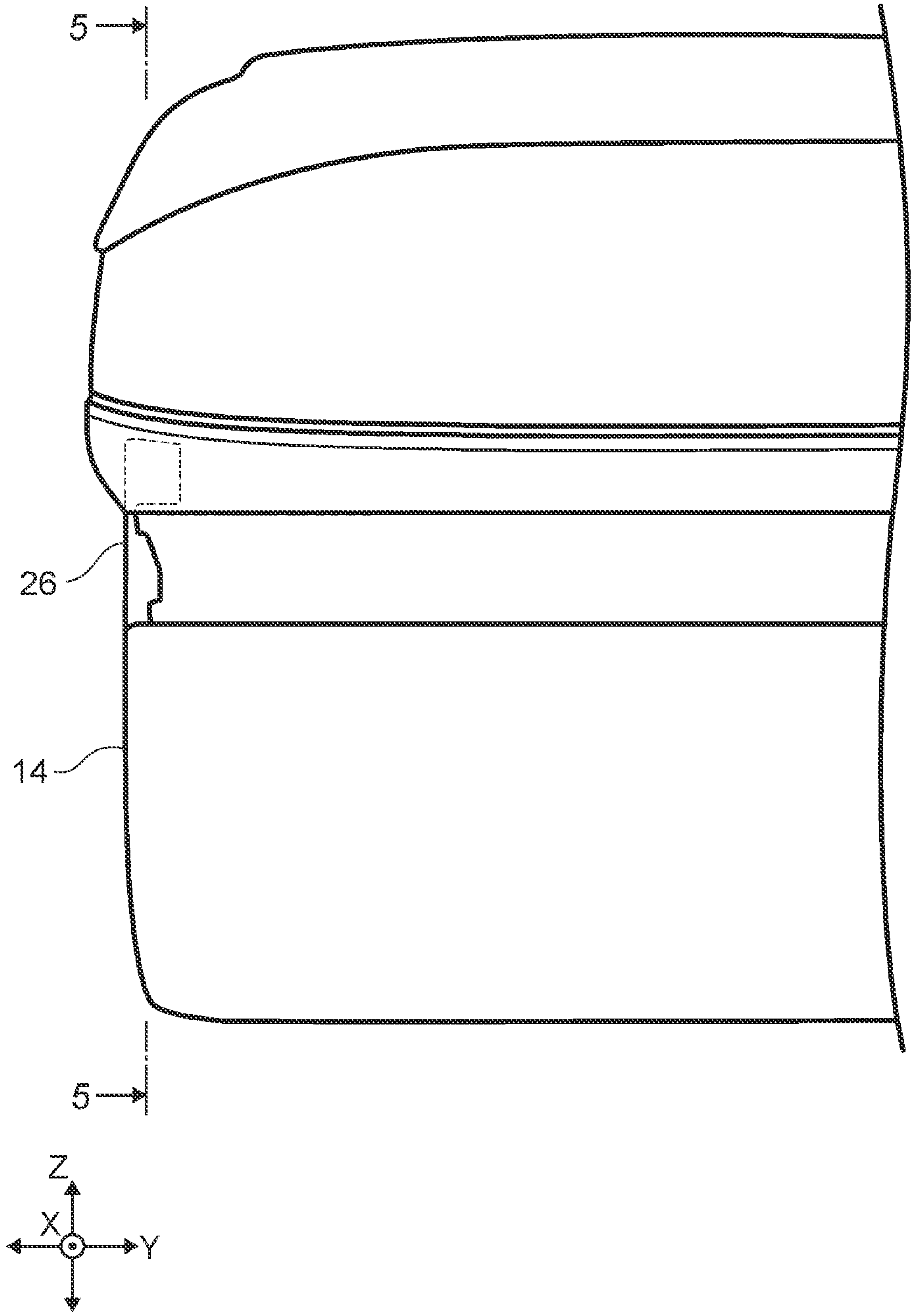
FIG. 4 is a face-on view to explain a vehicular back door according to the present exemplary embodiment.

As illustrated in FIG. 3, the first adhesive 18A joins the first panel 12 and the second panel 14 together. Note that FIG. 5 is a cross-section taken on line 5-5 in FIG. 4. Moreover, although in the present exemplary embodiment an example is illustrated of a state in which two panel members are joined together, in the present disclosure another member may be disposed between the two panel members. Namely, the back door may be configured by indirect joining.

In the present exemplary embodiment the second adhesive 18B joins the bracket 26 and the first panel 12 together. Note that in the present disclosure, the bracket 26 and the first panel 12 may be joined together by, instead of using the second adhesive 18B, being joined together with welding by thermal welding or ultrasonic welding, for example.

In the present exemplary embodiment the third adhesive 18C joins the bracket 26 and the second panel 14 together by being interposed between a join face of the second panel 14 and a join face of the bracket 26. Note that in the present disclosure, the bracket 26 and the second panel 14 may be joined together by, instead of using the third adhesive 18C, being joined together with welding by thermal welding or ultrasonic welding, for example.

Moreover, in the present exemplary embodiment, the second adhesive 18B and the third adhesive 18C are, as illustrated in FIG. 5, linked to the first adhesive 18A. In the present disclosure the second adhesive 18B may be separated from the first adhesive 18A. Moreover, the third adhesive 18C may also be separated from the first adhesive 18A.

Bracket

The brackets 26 that each serve as a joining member are made from resin, and may also be molded using an injection molding machine, for example. Specifically, an Acrylate Styrene Acrylonitrile (ASA) resin may, for example, be employed in the bracket 26 of the present exemplary embodiment. Note that in the present disclosure the resin material employed to mold the bracket is not particularly limited.

The bracket 26 of the present exemplary embodiment is a vehicular bracket for supporting a panel member. In the present disclosure the bracket 26 may, for example, be a member other than a bracket such as a panel member. Moreover, in the present disclosure the second panel 14 may be a component other than for a vehicle.

As illustrated in FIG. 5, the bracket 26 is a separate member from both the first panel 12 and the second panel 14. The bracket 26 is interposed between the first panel 12 and the second panel 14. The bracket 26 couples the first panel 12 and the second panel 14 together. The bracket 26 includes a base 26A and a protruding portion 26B.

The base 26A is joined to the second panel 14 by the second adhesive 18B. As illustrated in FIG. 5, the protruding portion 26B is contiguous with the base 26A, and protrudes outside from a portion where the base 26A and the second panel 14 are joined in an adhesion region H, namely toward an upper side in FIG. 5.

Base

The base 26A is a plate shaped member made from resin. The base 26A includes a first base portion 26A1 to be positioned on the inside of the second recess 14B, and a second base portion 26A2 that is contiguous to the first base portion 26A1 and bends around at a left end of the first base portion 26A1 as illustrated in FIG. 5 and extends downward therein. The first base portion 26A1 extends along a side wall of the second recess 14B of the second panel 14 in FIG. 5. The second base portion 26A2 extends along the first panel 12 and the second panel 14 at a lower side of the second recess 14B in FIG. 5.

Protruding Portion

In the present exemplary embodiment the protruding portion 26B is a plate shaped member made from resin. In the present disclosure the material of the protruding portion 26B may be any material capable of being joined to the panel members, and may be a metal, for example.

The protruding portion 26B includes a first wall 26B1, a second wall 26B2, and a lid portion 26B3, as illustrated in FIG. 5. The first wall 26B1 extends upward in FIG. 5 from a position in the vicinity of a boundary between the first base portion 26A1 and the second base portion 26A2 of the base 26A. The second wall 26B2 extends upward from a right end of the first base portion 26A1 of the base 26A in FIG. 5. The lid portion 26B3 links the first wall 26B1 and the second wall 26B2 together at a position on the upper side of and inside the second recess 14B.

The first wall 26B1 is joined to the first panel 12. The second wall 26B2 is joined to the second panel 14. In the present disclosure the lid portion 26B3 may be omitted. The first base portion 26A1 of the base 26A and the protruding portion 26B of the bracket 26 are disposed inside the second recess 14B of the second panel 14.

Coupling Portion

As illustrated in FIG. 5, the first coupling portion 30A is provided at the adhesion region H and couples the bracket 26 and the second panel 14 together. The second coupling portion 30B is provided at the adhesion region H separated from the first coupling portion 30A and couples the bracket 26 and the second panel 14 together. In the present exemplary embodiment, the first coupling portion 30A and the second coupling portion 30B are each formed by a fitting structure. In the present disclosure the first coupling portion 30A and the second coupling portion 30B may have a joint structure other than a fitting structure, such as a weld structure.

The first coupling portion 30A is formed by a first projection portion 14P1 and a first opening 26A3. The first projection portion 14P1 fits into the first opening 26A3. The second coupling portion 30B is formed by a second projection portion 14P2 and a second opening 26A4 The second projection portion 14P2 fits into the second opening 26A4.

Figure 6:
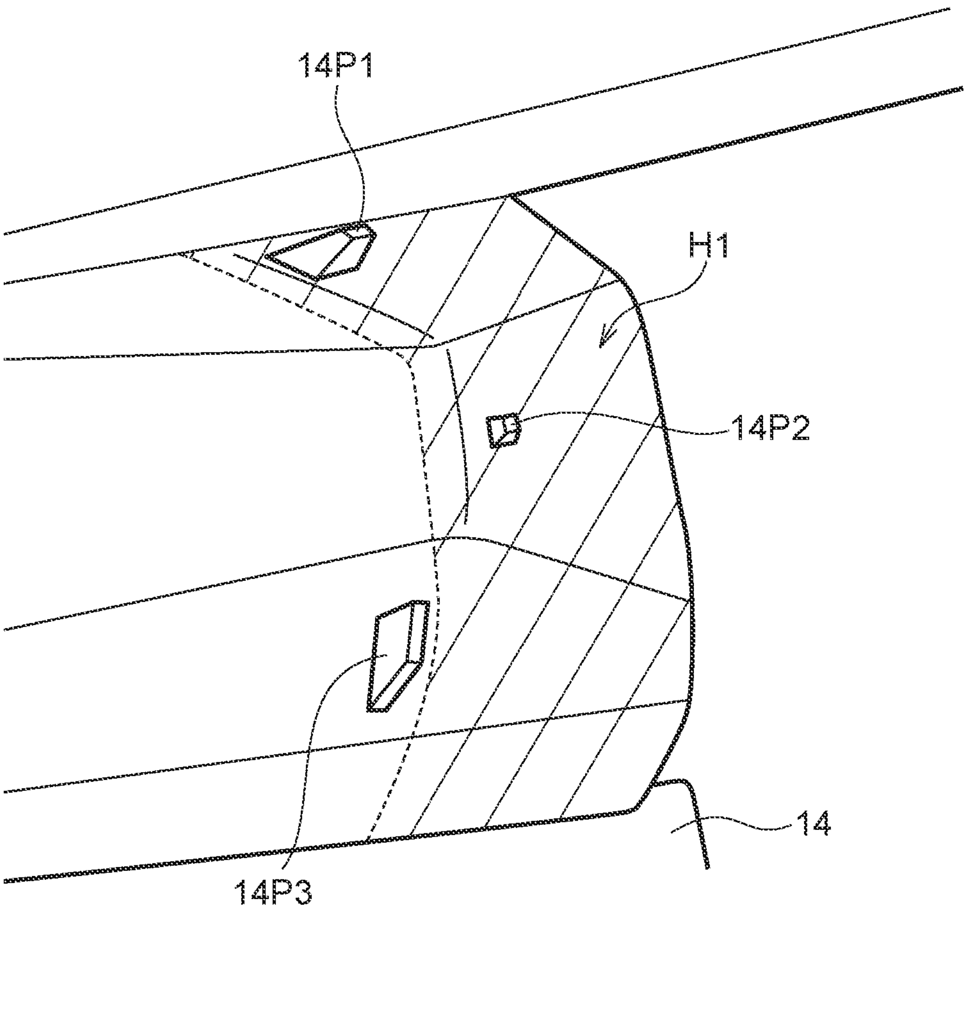
FIG. 6 is a diagram to explain an outer panel serving as a member to be joined in a vehicular back door according to the present exemplary embodiment.

As illustrated in FIG. 6, the first projection portion 14P1 and the second projection portion 14P2 are provided in a first planned adhesive placement region H1 pre-set on the second panel 14. The first projection portion 14P1 and the second projection portion 14P2 respectively protrude from the surface of the first planned adhesive placement region H1. In the present exemplary embodiment, the first projection portion 14P1 and the second projection portion 14P2 narrow on progression from a base thereof on the first planned adhesive placement region H1 surface side toward a leading end thereof, however in the present disclosure the shape of the projection portions may be modified as appropriate.

Figure 7:
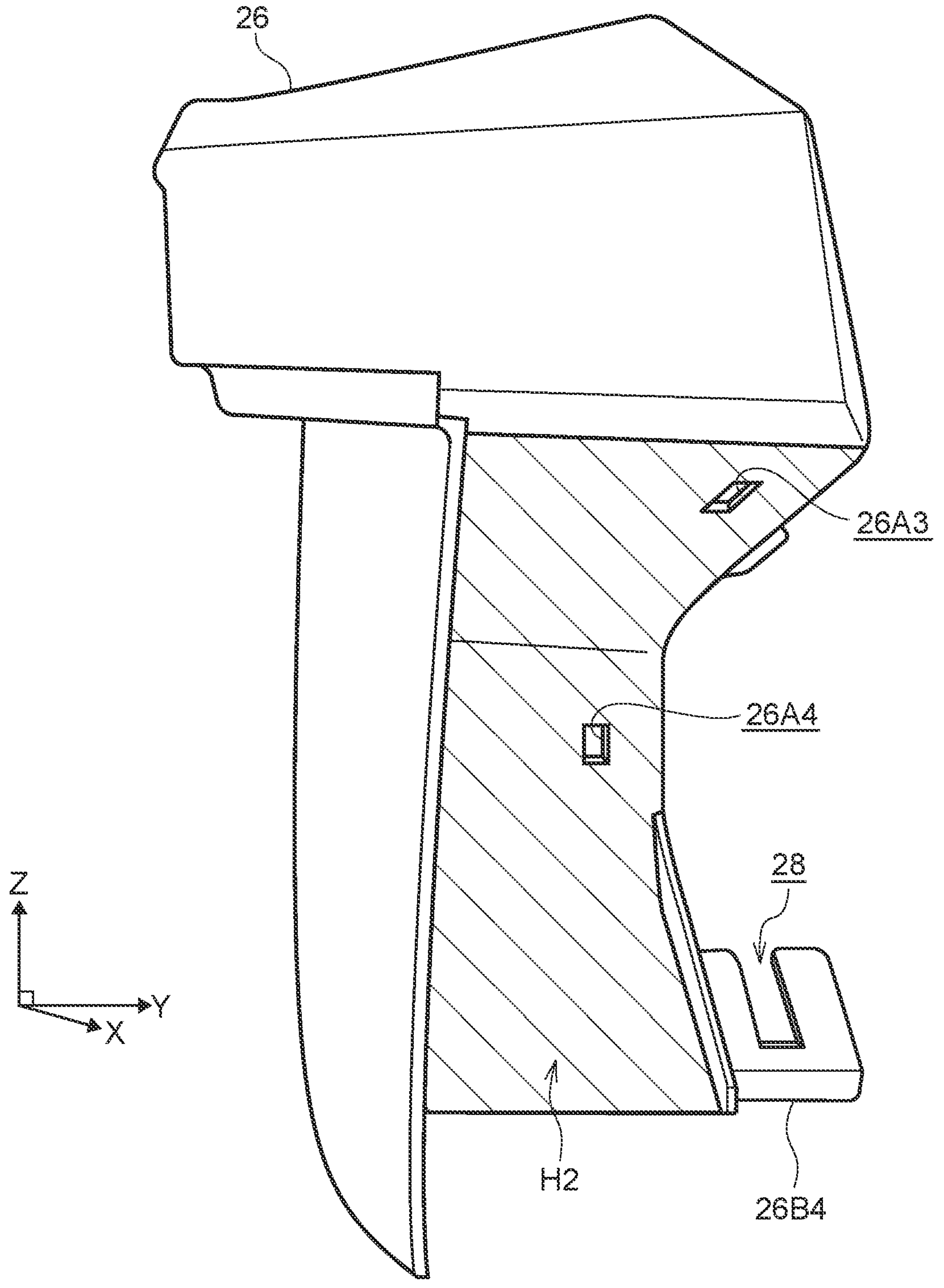
FIG. 7 is a perspective view to explain a bracket serving as a joining member in a vehicular back door according to the present exemplary embodiment.

As illustrated in FIG. 7, the first opening 26A3 and the second opening 26A4 are formed in the second planned adhesive placement region H2 pre-set on the bracket 26. In the present exemplary embodiment the first opening 26A3 and the second opening 26A4 both have rectangular shapes when the openings are viewed face-on, however in the present disclosure the shape of the openings may be modified as appropriate.

Rotation Stop Portion

As illustrated in FIG. 1, the rotation stop portion 30C is separated from an imaginary line L connecting the first coupling portion 30A and the second coupling portion 30B. The imaginary line L connects the first coupling portion 30A and the second coupling portion 30B together. In the present exemplary embodiment there are two coupling portions, the first coupling portion 30A and the second coupling portion 30B, contained on the single imaginary line L. Note that in the present disclosure the number of coupling portion contained on the single imaginary line L is freely selected. The rotation stop portion 30C stops the bracket 26 from rotating about an axis of the imaginary line L.

In the present exemplary embodiment the number of the rotation stop portions 30C is one, however in the present disclosure the number of rotation stop portions is one or more, and may be a freely selected plural number. Moreover, in FIG. 1 the imaginary line L is illustrated in an example of a state passing through the apex of the first projection portion 14P1 and the apex of the second projection portion 14P2, however a state of the imaginary line L passing through two or more coupling portions is not actually limited thereto. The position of the imaginary line may be changed according to the shape of each portion configuring the coupling portions, and according to the direction of force imparted to the joint structure. This means that the position of the actual imaginary line that decides rotation of the joining member is appropriately set from out of one or more states of imaginary lines able to pass through two or more coupling portions.

In the present exemplary embodiment, the rotation stop portion 30C is formed by a welded structure. Specifically, in the present exemplary embodiment, the rotation stop portion 30C is formed by welding a coupling base portion 26B4 of the bracket 26 and one portion of the second panel 14. The coupling base portion 26B4 is a plate shaped portion provided contiguously to the base 26A of the bracket 26.

In the present disclosure, the coupling base portion may, for example, be provided contiguously to a portion other than the base 26A such as to the protruding portion 26B. Moreover, a third projection portion may be provided to the bracket 26 as well as a coupling base portion being provided to the second panel 14. Moreover, in the present disclosure the rotation stop portion 30C may, for example, be a joint structure other than a weld structure, such as a fitting structure. Moreover, in the present disclosure the rotation stop portion may be a support structure such as a projection shaped rib including a surface for contacting the bracket 26.

Joining Operation

Next, description follows regarding a joining operation according to the present exemplary embodiment, with reference to FIG. 6 to FIG. 9. First, as illustrated in FIG. 6, the second panel 14 provided with a third projection portion 14P3 is pre-prepared. The third projection portion 14P3 protrudes from the surface at a position separated from the first planned adhesive placement region H1 on the surface of the second panel 14.

Moreover, as illustrated in FIG. 7, the bracket 26 including a third opening 28 in the coupling base portion 26B4 is pre-prepared. The third opening 28 is formed at a position corresponding to the third projection portion 14P3 separated from the second planned adhesive placement region H2 on the surface of the bracket 26. The third opening 28 of the present exemplary embodiment is a rectangular shaped cut out when the opening is viewed face-on.

Next, the third adhesive 18C is disposed in the first planned adhesive placement region H1 of the second panel 14. The third adhesive 18C may, for example, be disposed in a string shape by being pushed continuously out from inside a nozzle at a distal end of a dedicated tube or hose.

Then the second planned adhesive placement region H2 of the bracket 26 is caused to approach the first planned adhesive placement region H1 of the second panel 14 along the pre-set approach direction. As a result of this approach, the first base portion 26A1 of the base 26A and the protruding portion 26B of the bracket 26 are inserted into the second recess 14B of the second panel 14. The join face of the base 26A of the bracket 26, and the join face of the second wall 26B2 of the protruding portion 26B are then superimposed on the join face of the second panel 14.

Figure 8:
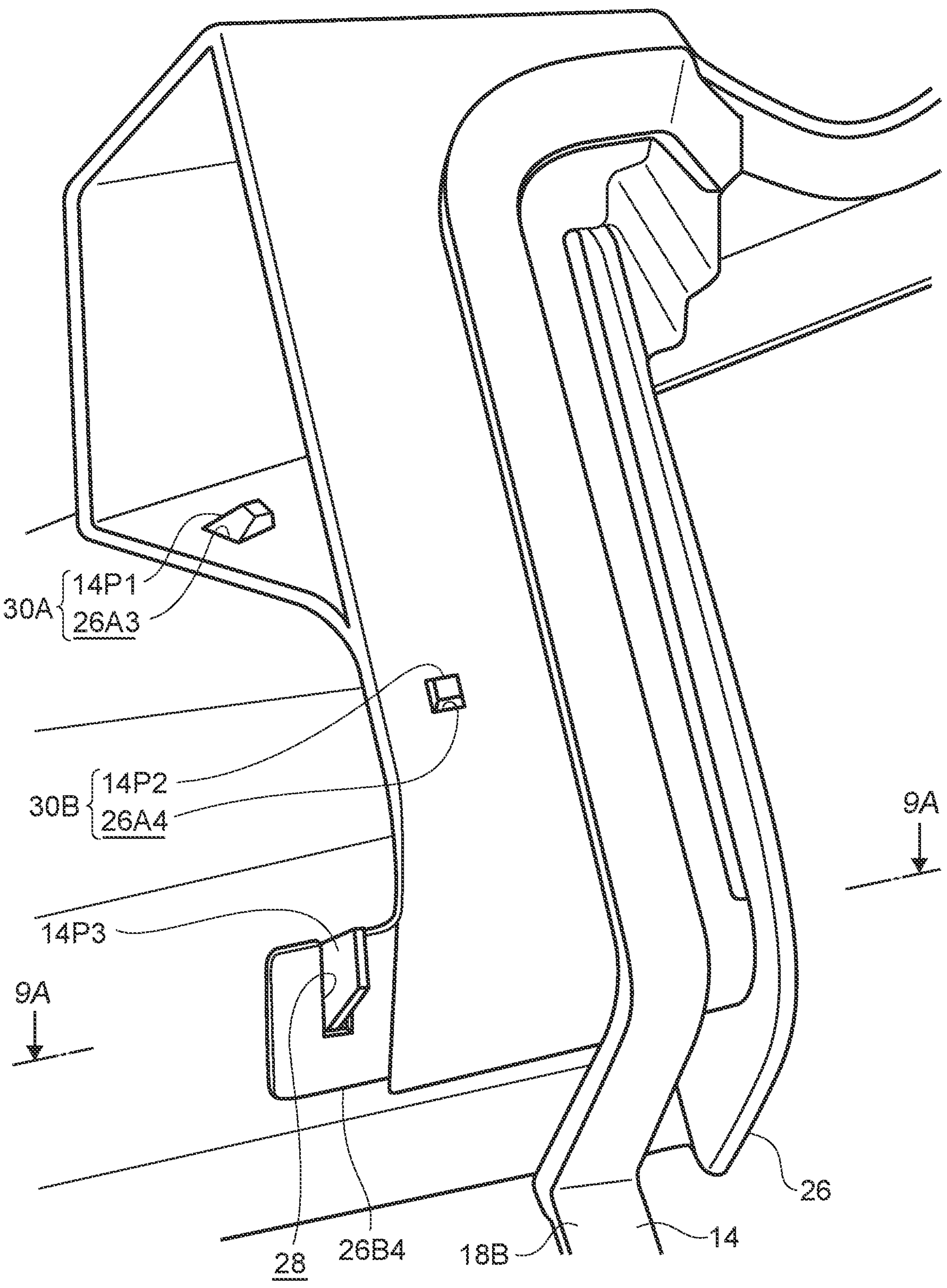
FIG. 8 is a diagram to explain a manufacturing method of a joint structure according to the present exemplary embodiment.
Figure 9A:
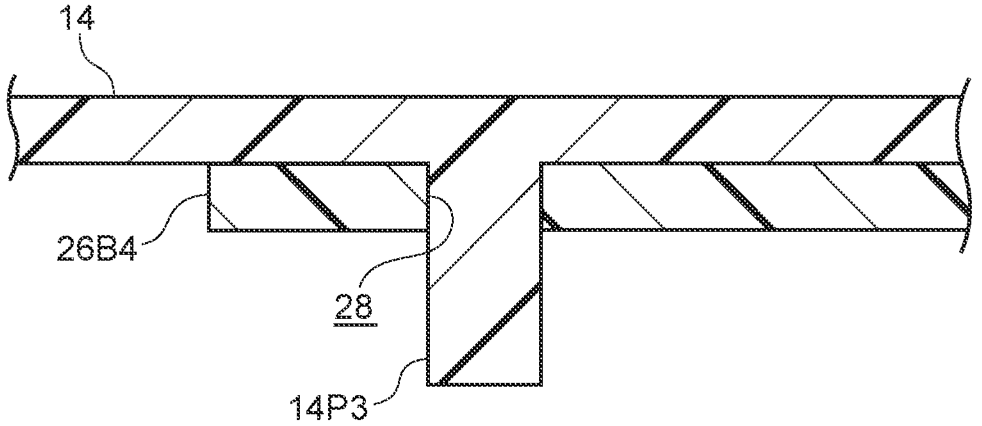
FIG. 9A is a cross-section to explain a state in which a protrusion of an outer panel has been inserted into an opening of a bracket of a joint structure according to the present exemplary embodiment.

As illustrated in FIG. 8, when the bracket 26 is superimposed on the second panel 14, the first projection portion 14P1 of the second panel 14 is fitted into the first opening 26A3 of the bracket 26, and the second projection portion 14P2 is fitted into the second opening 26A4. When superimposing, the third projection portion 14P3 of the second panel 14 is fitted into the third opening 28 of the coupling base portion 26B4 of the bracket 26, as illustrated in FIG. 9A. Note that FIG. 9A is a cross-section of the joint structure 100 sectioned at the position of line 9A-9A in FIG. 8 in a plane perpendicular to the surface of the coupling base portion 26B4.

Figure 9B:
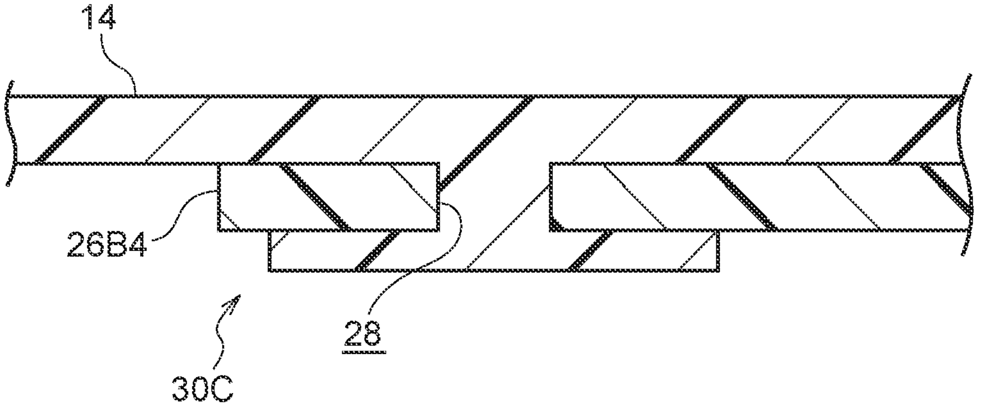
FIG. 9B is a cross-section to explain a welded state of a portion surrounding an opening of a bracket and a protrusion of an outer panel in a joint structure according to the present exemplary embodiment.

Next, the leading end of the third projection portion 14P3 protruding downward from the third opening 28 of the coupling base portion 26B4 as illustrated in FIG. 9B is welded to the coupling base portion 26B4 using, for example, an ultrasonic welding method. Note that other than an ultrasonic welding method, the present disclosure may adopt another welding method such as, for example, a vibration welding method. The rotation stop portion 30C is provided by welding so as to be separated from the imaginary line L at the outside of the adhesion region H. Note that in the present disclosure the rotation stop portion 30C may be provided inside the adhesion region H. A joint structure according to the present exemplary embodiment may be realized by performing the cycle of processes described above.

Furthermore, the second adhesive 18B is disposed on a planned adhesive placement region pre-set for joining to the first panel 12 on the join face of the bracket 26. Moreover, the first adhesive 18A is disposed on a planned adhesive placement region pre-set for joining to the first panel 12 on the join face of the second panel 14. In the present exemplary embodiment, the first adhesive 18A and the second adhesive 18B are standardized with a single adhesive.

Namely, disposing the second adhesive 18B on the surface of the bracket 26 in the planned adhesive placement region and disposing the first adhesive 18A on the surface of the second panel 14 in the planned adhesive placement region may be performed continuously using a common adhesive. The planned adhesive placement region for the second adhesive 18B and the planned adhesive placement region for the first adhesive 18A are omitted in the drawings. Note that in the present disclosure the first adhesive and the second adhesive may differ from each other.

Next, the join face of the first panel 12 is caused to approach the planned adhesive placement region for the first panel 12 on the bracket 26 along a pre-set approach direction. Moreover, the join face of the first panel 12 is caused to approach the planned adhesive placement region for the first panel 12 on the second panel 14 along a pre-set approach direction that is a horizontal direction. Then the join face of the second base portion 26A2 of the base 26A of the bracket 26 and the join face of the first panel 12 are superimposed on each other. A back door according to the present exemplary embodiment can be manufactured by performing the cycle of processes described above.

In the present exemplary embodiment, due to the rotation stop portion 30C being separated from the imaginary line L, the bracket 26 can be stopped from rotating while the third adhesive 18C is still curing in the joining operation about an axis of the imaginary line L connecting the first coupling portion 30A and the second coupling portion 30B.

Comparative Example

Figure 10:
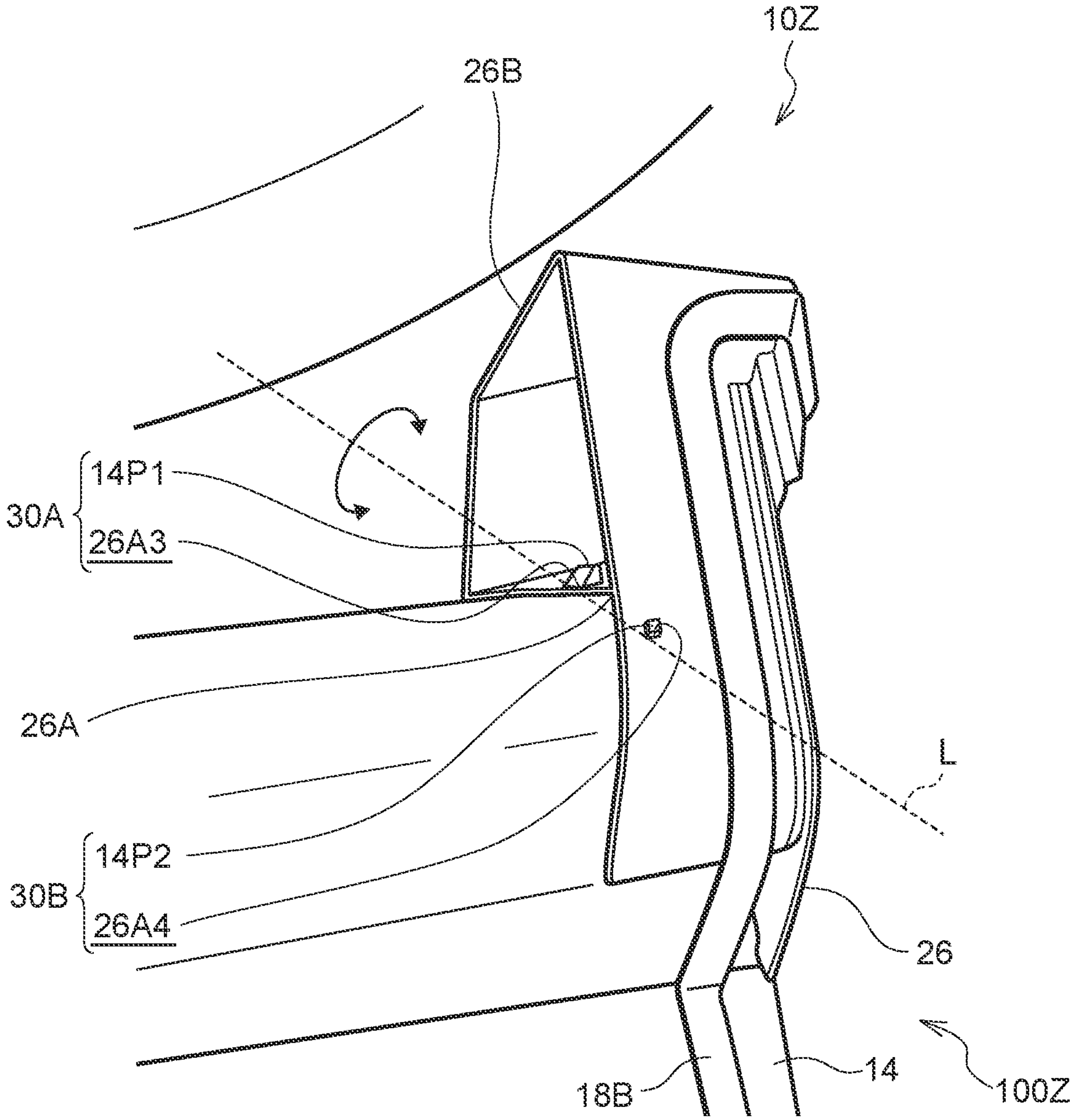
FIG. 10 is a diagram to explain a self-joining structure according to a comparative example.

Next, description follows regarding a joint structure 100Z according to a comparative example, with reference to FIG. 10 to FIG. 13. As illustrated in FIG. 10, the joint structure 100Z according to the comparative example includes a vehicular back door 10Z according to the comparative example. The joint structure 100Z according to the comparative example differs from the present exemplary embodiment in not including a rotation stop portion 30C.

Figure 11:
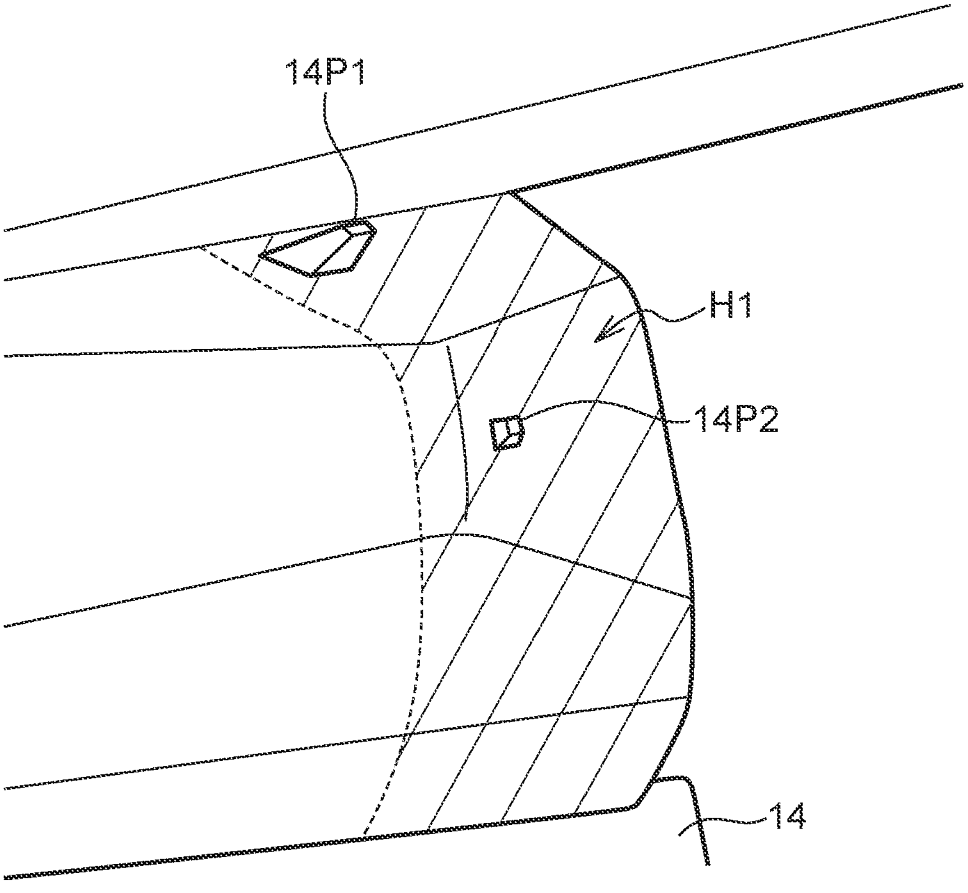
FIG. 11 is a diagram to explain an outer panel serving as a member to be joined in a vehicular back door according to the comparative example.
Figure 12:
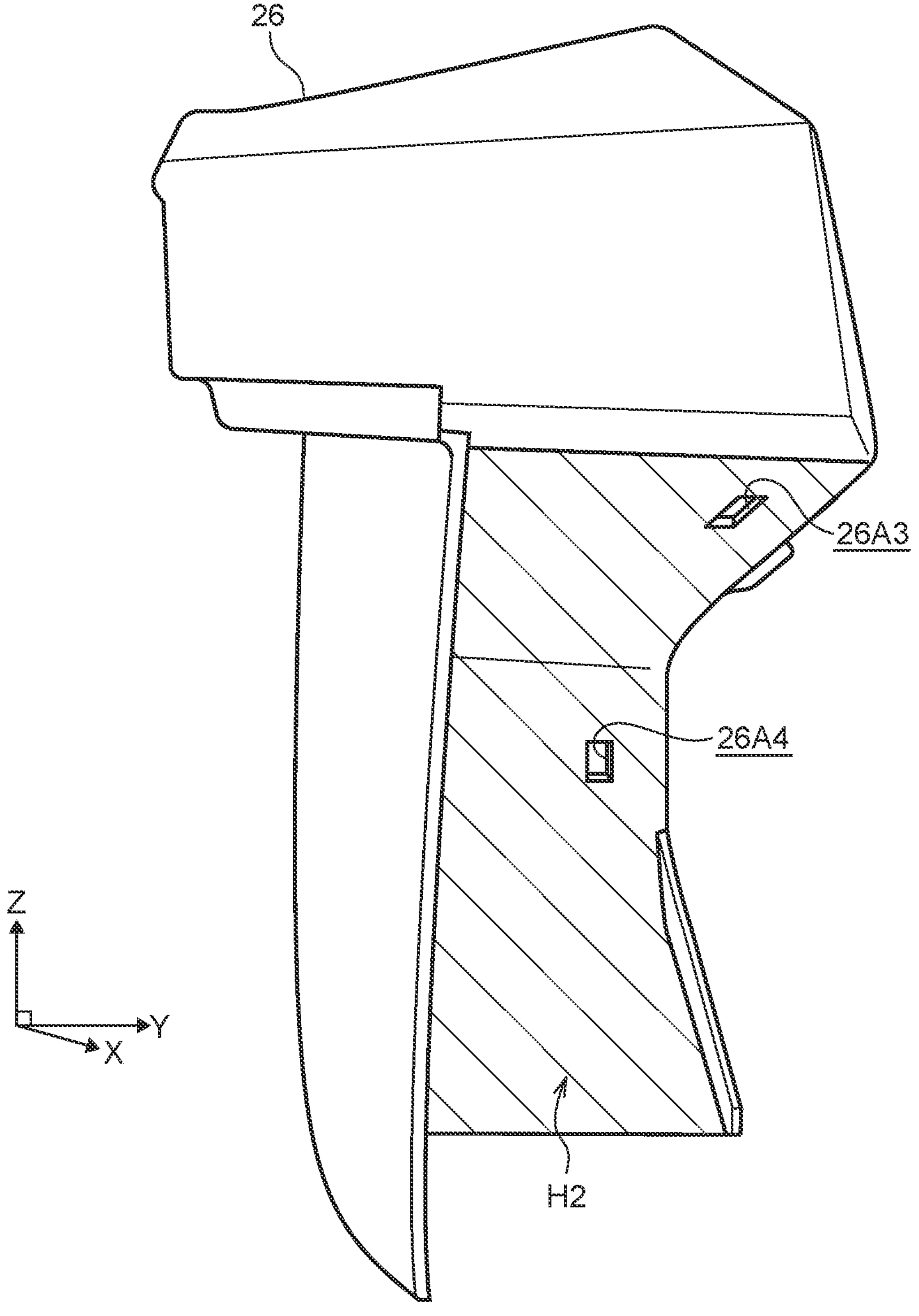
FIG. 12 is a perspective view to explain a bracket serving as a joining member in a vehicular back door according to the comparative example.

As illustrated in FIG. 11, a third projection portion 14P3 such as that of the present exemplary embodiment is not provided to the second panel 14 in the comparative example. Moreover, as illustrated in FIG. 12, in the comparative example a coupling base portion 26B4 such as that of the present exemplary embodiment is not provided to the bracket 26. This means that in the comparative example, the bracket 26 is liable to move while the third adhesive 18C is still curing. For example, a motion of the join face of the bracket 26 adhered to the join face of the second panel 14 separating away from the join face of the second panel 14 and re-adhering thereto might repeatedly occur. FIG. 10 illustrates an example of a state in which the bracket 26 rotates about a rotation axis of the imaginary line L, as illustrated by the double-direction arrow.

Figure 13:
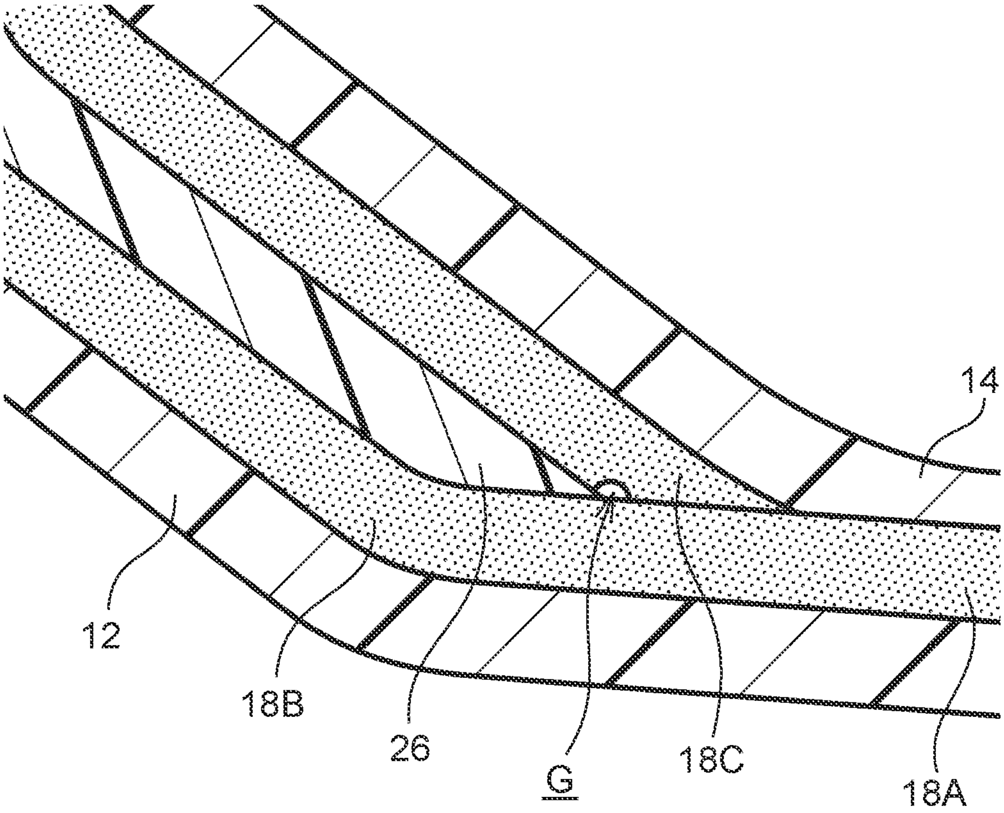
FIG. 13 is a cross-section to explain an enlargement of a portion A in FIG. 5 in a vehicular back door according to the comparative example.
Figure 14A:
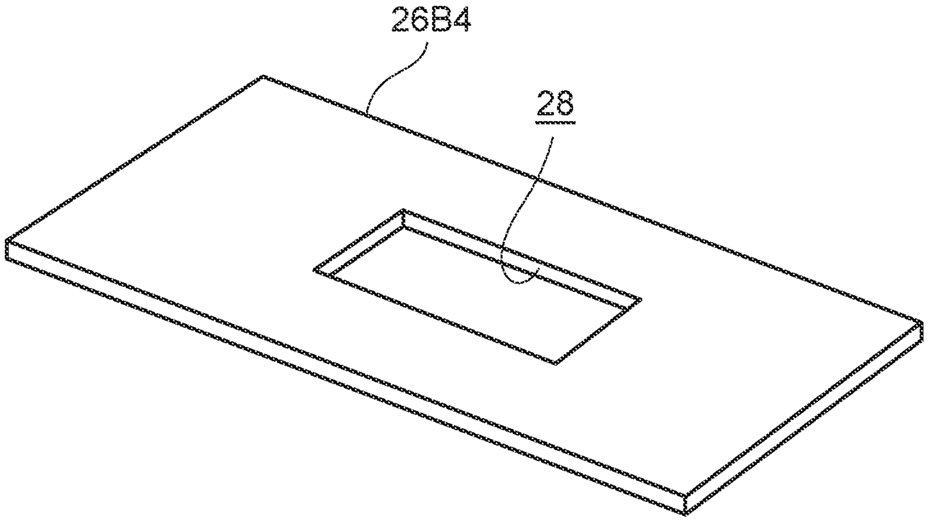
FIG. 14A is a perspective view to explain an opening of a joining member according to a first modified example.
Figure 14B:
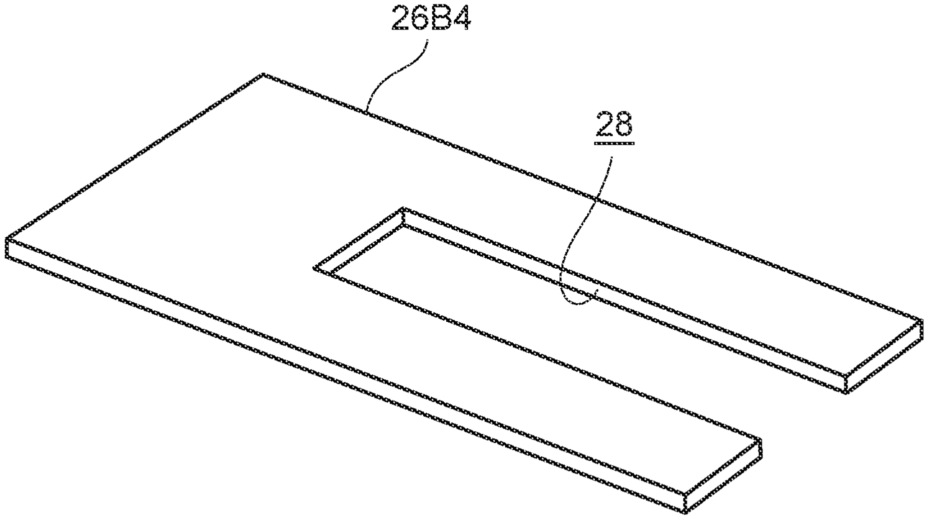
FIG. 14B is a perspective view to explain an opening of a joining member according to a second modified example.

Moreover, FIG. 13 illustrates a state in which a groove G has been formed at a boundary between the first adhesive 18A, the second adhesive 18B, third adhesive 18C, and the bracket 26 due to the rotation movement of the bracket 26. Note that in the present disclosure the position where a groove is formed is not limited to the position in FIG. 13, and may change as appropriate.

Modified Examples

Next, description follows regarding joint structures according to modified examples, with reference to FIG. 14 to FIG. 19. In the present disclosure the shape of the third opening 28 of the coupling base portion 26B4 may be modified as appropriate. For example, as illustrated in FIG. 14A, the third opening 28 may be a rectangular shaped through hole. Moreover, as illustrated in FIG. 14B, the third opening 28 may be a rectangular shaped cut out. In the present disclosure, the opening shape of the third opening 28 is not limited to being a rectangular shape, and a freely selected geometric shape may be adopted therefor.

Figure 15A:
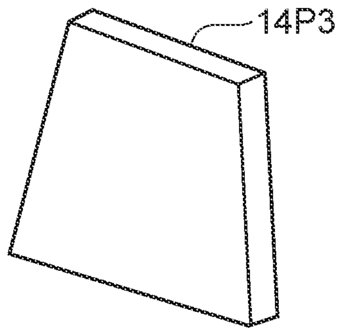
FIG. 15A is a perspective view to explain a protruding portion of a joining member according to a third modified example.
Figure 15B:
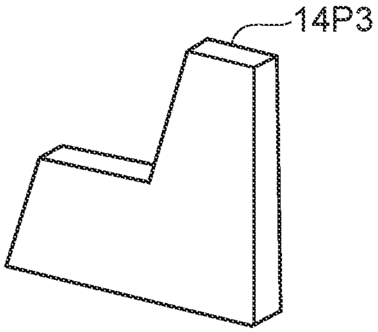
FIG. 15B is a perspective view to explain a protruding portion of a joining member according to a fourth modified example.
Figure 15C:
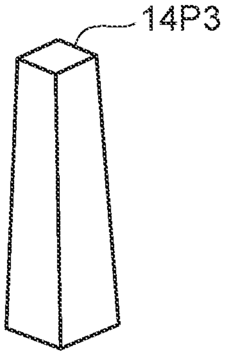
FIG. 15C is a perspective view to explain a pillar shaped protrusion of a member to be joined according to a fifth modified example.
Figure 15D:
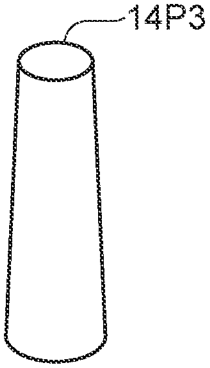
FIG. 15D is a perspective view to explain a pillar shaped protrusion of a member to be joined according to a sixth modified example.

Moreover, in the present disclosure, the shape of the third projection portion 14P3 may be modified as appropriate. For example, as illustrated in FIG. 15A, the shape of the third projection portion 14P3 may be a rectangular flat plate shape. Moreover, as illustrated in FIG. 15B, the shape of the third projection portion 14P3 may be flat plate shape with a high profile in which a portion at the leading end thereof has been cut out. Moreover, as illustrated in FIG. 15C, the shape of the third projection portion 14P3 may be a polygonal pillar shape such as a square pillar. Moreover, as illustrated in FIG. 15D, the shape of the third projection portion 14P3 may be a pillar shape such as a circular pillar or elliptical pillar.

Figure 16A:
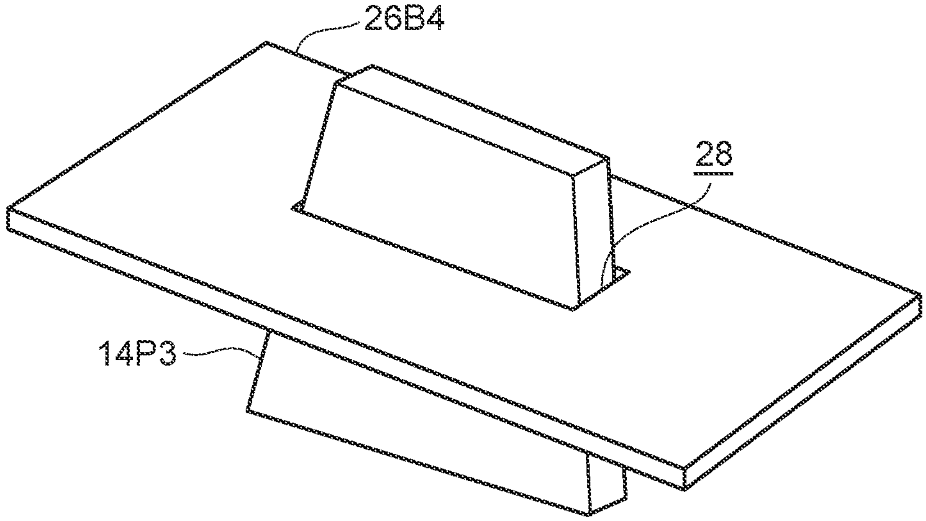
FIG. 16A is a perspective view to explain a state in which a plate shaped protrusion of a member to be joined according to the third modified example has been inserted into an elongated hole opening in the joining member according to the first modified example.
Figure 16B:
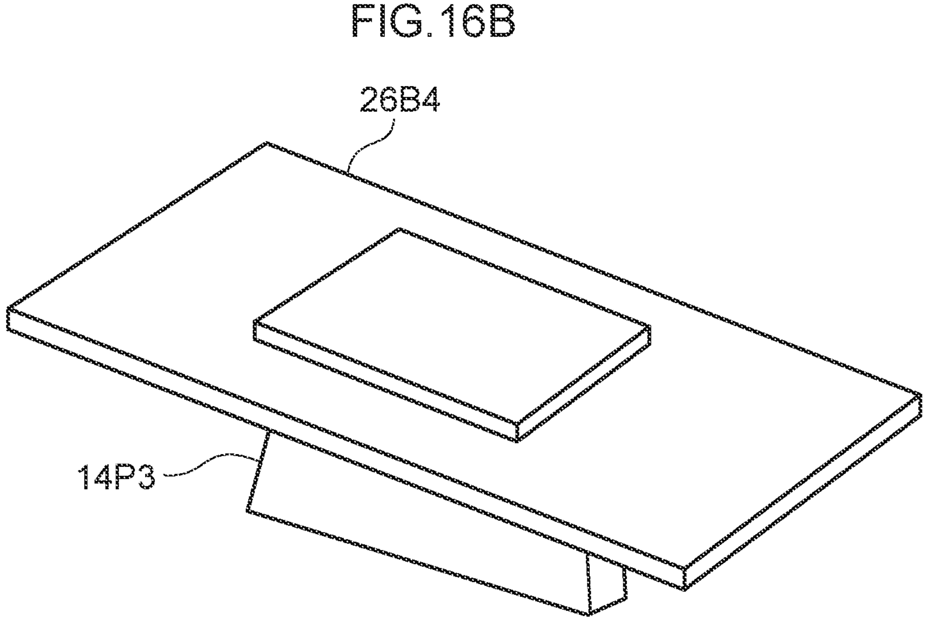
FIG. 16B is a cross-section to explain a state in which a portion surrounding an opening of an elongated hole of a joining member according to the first modified example and a plate shaped protrusion of a member to be joined according to the third modified example have been welded together.

FIG. 16A illustrates an example of a state in which the flat plate shaped third projection portion 14P3 has been inserted into the third opening 28 of a rectangular shaped through hole of the coupling base portion 26B4. As illustrated in FIG. 16B, the third projection portion 14P3 and the coupling base portion 26B4 can be integrated together by welding the leading end of an upper portion of the third projection portion 14P3.

Figure 17A:
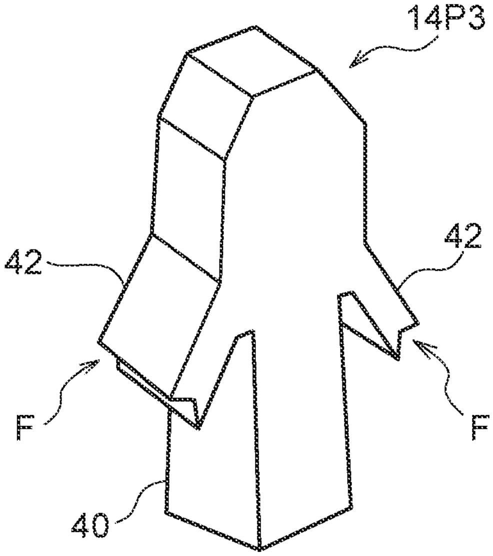
FIG. 17A is a perspective view to explain a pillar shaped protrusion including claw portions of an outer panel in a vehicular back door according to a seventh modified example.

Moreover, in the present disclosure the structure of the rotation stop portion 30C is not limited to being a weld structure. For example, as illustrated in FIG. 17A, the third projection portion 14P3 may include a pillar shaped body 40, and claw portions 42 that protrude outside the body 40 from side faces of a pillar of the body 40. Steps F are formed at end faces of the claw portions 42 opposing the third opening 28.

Figure 17B:
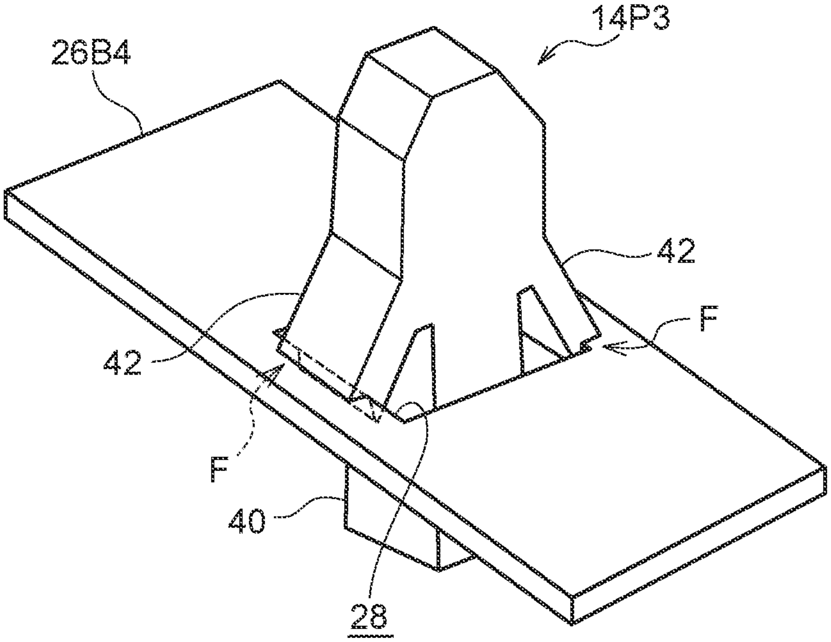
FIG. 17B is a perspective view to explain a state in which a pillar shaped protrusion including claw portions of an outer panel have been fitted to an inside face of an elongated hole opening of a bracket.

As illustrated in FIG. 17B, the third projection portion 14P3 is inserted into the third opening 28 of the coupling base portion 26B4, and the third projection portion 14P3 is fitted into the third opening 28 in a state in which the steps F are abutted against an inner face of the third opening 28. In the fitted state, the claw portions 42 press the coupling base portion 26B4 from the inside of the third opening 28 toward the outside thereof. This thereby enables the coupling base portion 26B4 to be suppressed from moving toward the leading end of the third projection portion 14P3.

Figure 18:
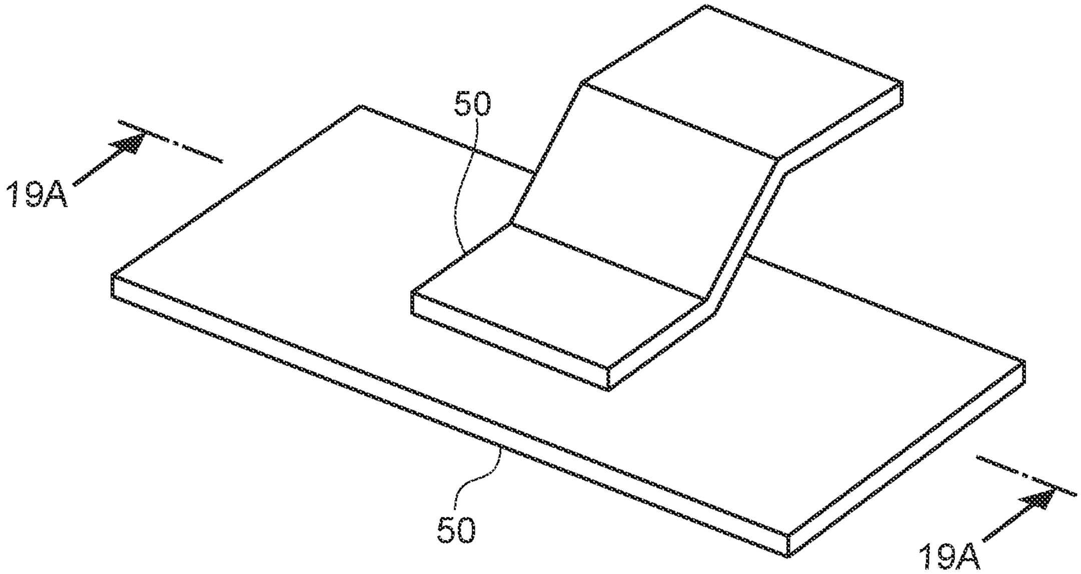
FIG. 18 is a perspective view to explain a rotation stop portion formed by vibration welding in a vehicular back door according to an eighth modified example.
Figure 19A:
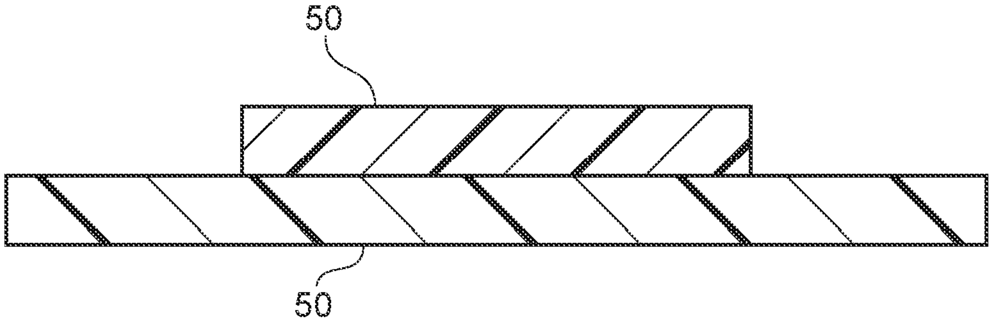
FIG. 19A is a cross-section taken along line 19A-19A in FIG. 18.
Figure 19B:
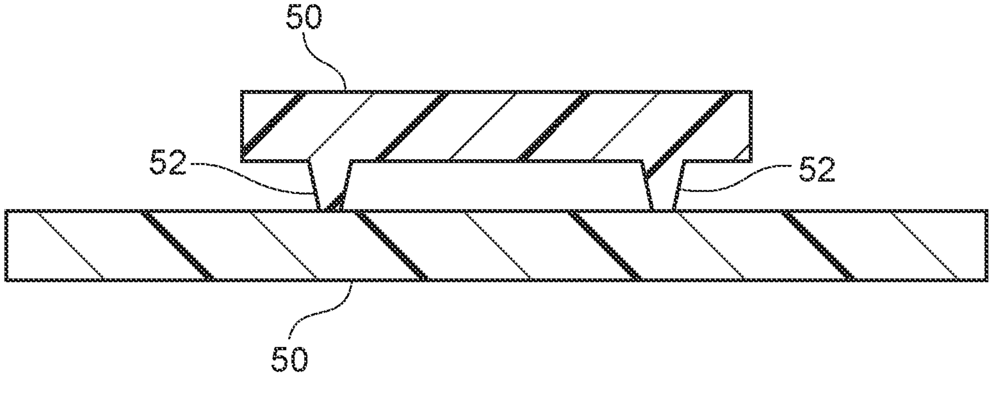
FIG. 19B is a cross-section to explain another example of a rotation stop portion formed by vibration welding.

Moreover, in the present disclosure, a welding operation to form the rotation stop portion 30C is not limited to melting the leading end of the projection portion and, for example as illustrated in FIG. 18, the surfaces of plate shaped members to be welded 50 may be opposed to each other. When surfaces of the members to be welded 50 have been opposed, the opposing faces of the members to be welded 50 may be welded as illustrated in FIG. 19A. Moreover, as illustrated in FIG. 19B, an opposing face of one of the members to be welded 50 may be welded to rib shaped or projection shaped portions to be welded 52 provided to the opposing face of the other member to be welded 50. Moreover, the shape of the portions to be welded 52 may be freely set, such as a point shape, namely a bead shape.

Operation and Advantageous Effects

In the joint structure 100 according to the present exemplary embodiment, the one or more rotation stop portions 30C are separated from the imaginary line L connecting the first coupling portion 30A and the second coupling portion 30B together. The rotation stop portion 30C stops the bracket 26 from rotating about an axis of the imaginary line L connecting the first coupling portion 30A and the second coupling portion 30B together. This means that movement of the bracket 26 can be better suppressed while the adhesive is still curing than a state in which a single coupling portion is provided, or a state in which two coupling portions are provided. As a result thereof, the formation of grooves in the adhesive in the adhesion region H caused by movement of the bracket 26 is suppressed. This thereby enables the waterproofness in the adhesion region H to be improved.

Moreover, due to forming each of the first coupling portion 30A and the second coupling portion 30B with a fitting structure in the present exemplary embodiment, the first coupling portion 30A and the second coupling portion 30B can be easily produced. Moreover, the rotation stop portion 30C is formed with a weld structure, and so integration of the bracket 26 and the second panel 14 is improved. This thereby enables the joining strength between the bracket 26 and the second panel 14 to be raised.

Moreover, in the present exemplary embodiment, the second panel 14 is a panel member, and also the bracket 26 is a bracket for supporting a panel member. This means that a resin back door 10 for a vehicle can be realized with raised waterproofness in the adhesion region H between the panel member and the bracket.

Other Exemplary Embodiments

Although the present disclosure has been described using the exemplary embodiments disclosed above, the statements and drawings that make up part of this disclosure should not be understood as being limitations to the present disclosure. For example, in the present disclosure the coupling portion and the rotation stop portion may, for example, be realized by double-sided tape.

Moreover, the present disclosure is not limited to a back door of a vehicle and is, for example, applicable to adhesion regions of panel portions made from resin in various vehicular components such as a bumper, a side mudguard, a fender, a back door garnish, a spoiler, and a radiator. Moreover, the present disclosure is not limited to vehicular components and is, for example, applicable to adhesion regions of panel portions made from resin configuring various structural bodies other than a vehicle, such as railway equipment or a building. The present disclosure includes various exemplary embodiments not described above, and the technical scope of the present disclosure is determined from the above description by the invention determining matter in the scope of the appropriate patent claims.

The entire content of the disclosure of Japanese Patent Application No. 2022-103845 filed on Jun. 28, 2022 is incorporated by reference in the present specification.

Moreover, all publications, patent applications and technical standards mentioned in the present specification are incorporated by reference in the present specification to the same extent as if each individual publication, patent application, or technical standard was specifically and individually indicated to be incorporated by reference.

EXPLANATION OF REFERENCE NUMERALS

10 vehicular back door
10Z vehicular back door
12 first panel
14 second panel
14A first recess
14B second recess
14P1 first projection portion
14P2 second projection portion
14P3 third projection portion
18A first adhesive
18B second adhesive
18C third adhesive
26 bracket
26A base
26A1 first base portion
26A2 second base portion
26A3 first opening
26A4 second opening
26B protruding portion
26B1 first wall
26B2 second wall
26B3 lid portion
26B4 coupling base portion
28 third opening
30A first coupling portion
30B second coupling portion
30C rotation stop portion
40 body
42 claw portion
50 member to be welded
52 portion to be welded
100 joint structure
100Z joint structure
F step
G groove
H adhesion region
H1 first planned adhesive placement region
H2 second planned adhesive placement region
L imaginary line
X front-rear direction
Y width direction
Z up-down direction

The invention claimed is:

1. A joint structure comprising:

a member to be joined that is made from resin;

an adhesive that is disposed on a join face of the member to be joined;

a joining member that includes a base made from resin joined to the member to be joined by the adhesive and a protruding portion that is contiguous to the base and that protrudes outside from an adhesion region between the base and the member to be joined;

a first coupling portion that is provided at the adhesion region and that couples the joining member and the member to be joined;

a second coupling portion that is separated from the first coupling portion at the adhesion region and that couples the joining member and the member to be joined; and at least one rotation stop portion that is separated from an imaginary line connecting the first coupling portion and the second coupling portion, and that is configured to stop the joining member from rotating about an axis of the imaginary line while the adhesive is curing.

2. The joint structure of claim 1, wherein:

the first coupling portion and the second coupling portion are each formed by a fitting structure; and the at least one rotation stop portion is formed by a weld structure.

3. A vehicular back door comprising the joint structure of claim 1, wherein:

the member to be joined is a panel member; and the joining member is a bracket that supports the panel member.

* * * * *